(12) United States Patent
Hooper et al.

(10) Patent No.: US 7,391,772 B2
(45) Date of Patent: Jun. 24, 2008

(54) NETWORK MULTICASTING

(75) Inventors: Donald F. Hooper, Shrewsbury, MA (US); Suresh S. Kalkunte, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 962 days.

(21) Appl. No.: 10/409,744

(22) Filed: Apr. 8, 2003

(65) Prior Publication Data

US 2004/0202164 A1 Oct. 14, 2004

(51) Int. Cl.
H04L 12/28 (2006.01)
H04L 12/56 (2006.01)
H04J 3/26 (2006.01)
G06F 15/173 (2006.01)

(52) U.S. Cl. .................. 370/390; 370/429; 370/432; 709/238

(58) Field of Classification Search ......... 370/229–352, 370/389–395, 429–432; 709/238–245, 200–227
See application file for complete search history.

(56) References Cited

U.S. PATENT DOCUMENTS

| | | | |
|---|---|---|---|
| 6,055,561 A * | 4/2000 | Feldman et al. ............. | 709/200 |
| 6,148,000 A * | 11/2000 | Feldman et al. ............. | 370/397 |
| 6,320,861 B1 * | 11/2001 | Adam et al. ............. | 370/395.7 |
| 6,636,511 B1 * | 10/2003 | Roy et al. .................... | 370/390 |
| 6,754,211 B1 * | 6/2004 | Brown ......................... | 370/389 |
| 6,785,274 B2 * | 8/2004 | Mahajan et al. ............. | 370/390 |
| 6,795,433 B1 * | 9/2004 | Li ............................... | 370/389 |
| 6,856,622 B1 * | 2/2005 | Calamvokis et al. ........ | 370/390 |
| 6,873,618 B1 * | 3/2005 | Weaver ....................... | 370/390 |
| 7,076,654 B2 * | 7/2006 | Kawamoto .................. | 713/163 |
| 7,103,045 B2 * | 9/2006 | Lavigne et al. ............. | 370/392 |
| 7,194,549 B1 * | 3/2007 | Lee et al. .................... | 709/238 |
| 2002/0075878 A1 * | 6/2002 | Lee et al. .................... | 370/401 |
| 2002/0126671 A1 * | 9/2002 | Ellis et al. ................... | 370/390 |
| 2002/0143951 A1 * | 10/2002 | Khan et al. ................. | 709/227 |

* cited by examiner

*Primary Examiner*—Man U. Phan
(74) *Attorney, Agent, or Firm*—Grossman, Tucker, Perreault & Pfleger, PLLC

(57) ABSTRACT

In general, in one aspect, the disclosure describes a technique of determining forwarding information for at least a sub-set of members of a multi cast group, and sending, toward a downstream entity, at most a single copy of data to be multicasted to the sub-set of members and the determined forwarding information.

33 Claims, 7 Drawing Sheets

NETWORK MULTICASTING

BACKGROUND

Networks enable computers and other devices to communicate. For example, networks can carry data representing video, audio, e-mail, and so forth. Typically, data sent across a network is divided into smaller messages. The structure and contents of the messages depend on the networking technology being used. For example, Internet Protocol (IP) datagrams include a destination address that is much like an address written on the outside of an envelope. Devices, known as routers, receive datagrams and can determine how to forward the datagram further toward its destination based on the destination address. Another network technology is known as Asynchronous Transfer Mode (ATM). In ATM, data messages, known as cells, include identification of a "circuit" that leads from the sender to the receiver. That is, rather than identifying a destination, an ATM cell identifies a path connecting the sender and receiver.

To complicate matters conceptually, IP and ATM can both be used to support the other technology. For example, an IP datagram can be divided across different ATM cells. A receiver can reassemble the IP datagram after receiving the ATM cells.

IP datagrams and ATM cells are examples of protocol data units (PDUs). A PDU includes a payload and header. The data in the header is often used by network protocols in handling the PDU (e.g., determining where to forward the PDU, whether transmission errors occurred, and so forth). Other examples of PDUs include frames (e.g., Ethernet and Synchronous Optical Network (SONET) frames) and segments (e.g., Transmission Control Protocol (TCP) segments).

A sender can send data to a single receiver. This is known as "unicasting". Alternately, a sender (or multiple senders) can send the same data to multiple members of a group. For example, a sender can send streaming video data to many different group members located at different points in the network. This is known as "multicasting".

Different protocols support multicasting in different ways. For example, in the Internet Protocol, instead of specifying a single destination, an IP datagram can specify a group address. ATM networks may also support multicasting in a variety of ways. For example, multicasting may be provided by a "tree" of circuits where a given circuit may feed diverging circuits downstream. Again, the above is merely a sampling of a wide variety of approaches to multicasting.

DETAILED DESCRIPTION

Figure 1:
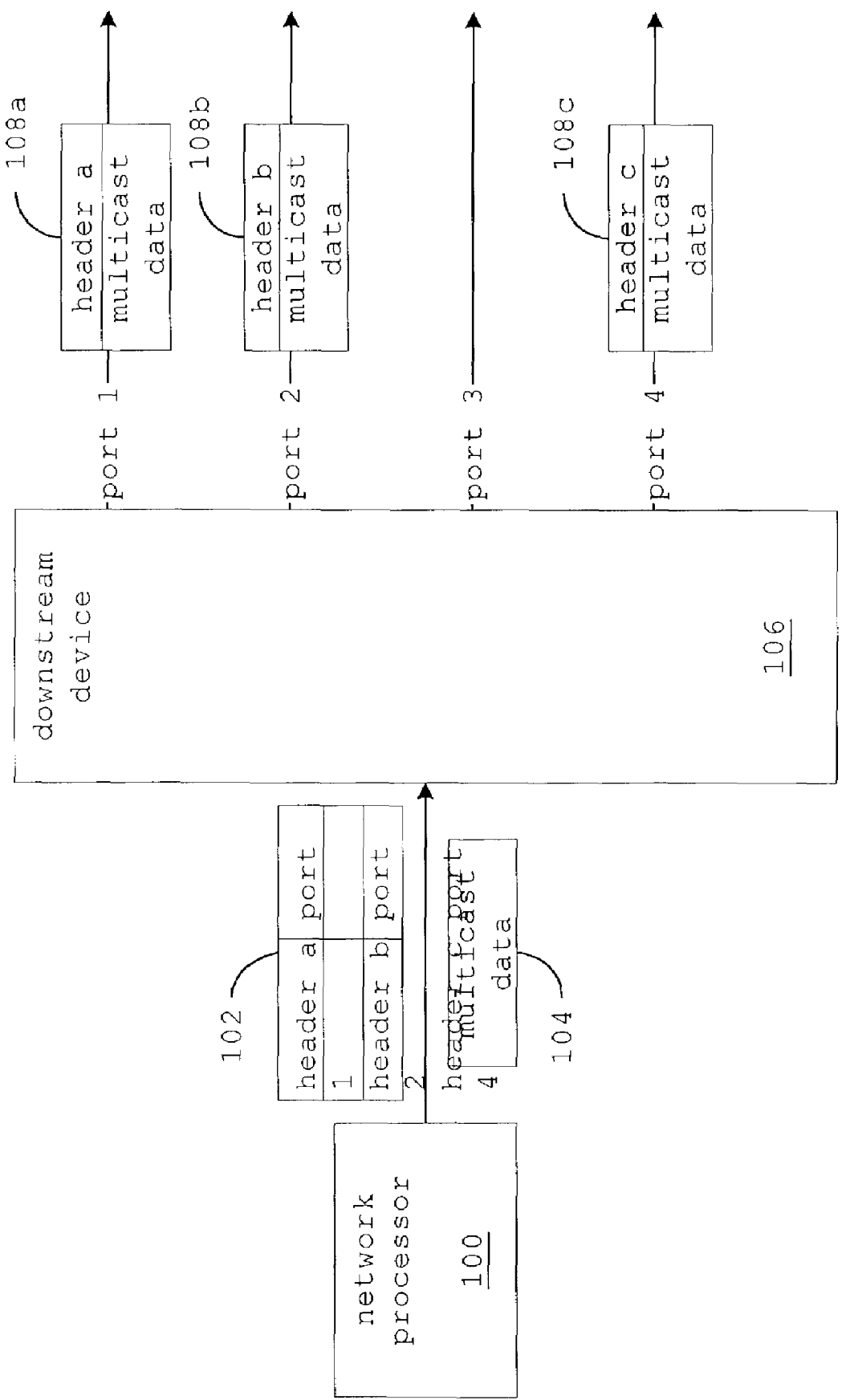
FIG. 1 is a diagram illustrating handling of multi cast data.

Multicasting can increase traffic handled by network devices. For example, where paths to different multi cast group members diverge, a device may need to construct multiple protocol data units (PDUs) (e.g., IP datagrams or ATM cells) having copies of the same multicast data, but destined for different group members. FIG. 1 illustrates a technique that can potentially reduce traffic associated with multicasting. In particular, the technique shown can delay replication of multi cast data to reduce traffic between a device 100 and a downstream device 106. As shown, instead of carrying multiple PDUs storing copies of the same multi cast data 104 between devices 100 and 106, FIG. 1 depicts a scheme where device 100 transmits one copy of the multi cast data 104 with control data 102. The downstream device 106, in turn, generates PDUs carrying the multi cast data and transmits the generated PDUs via the appropriate egress interfaces (e.g., links to remote network devices). The technique illustrated in FIG. 1 may not only reduce traffic between devices 100 and 106, but may also offload duties from device 100. For example, construction of the out-bound PDUs by the downstream device 106 can conserve resources of device 100.

In greater detail, the sample system of FIG. 1 includes a device 100, such as a network processor or an Application-Specific Integrated Circuit (ASIC), that processes PDUs received over a network. The processing can include a determination of how to forward a PDU. For example, a network processor may be programmed to determine which egress interface(s) (labeled "port 1"-"port n") of a downstream device 106 to send out received multi cast data. The downstream device 106 shown in FIG. 1 may be local to device 100. For example, the device 106 may be a medium access controller (MAC) (e.g., an Ethernet MAC), SONET framer, or other link layer device. Alternately, the downstream device 106 may be a remote device (i.e., one separated from device 100 by one or more network connections).

As shown in FIG. 1, the device 100 transmits multi cast data 104 (e.g., the payload(s) of one or more received multi cast PDUs) to the downstream device 106. The device 100 also transmits control information 102 that instructs the downstream device 106 how to handle multi cast data 104. For example, as shown, the control information 102 includes forwarding information such as identification of the downstream device 106 egress interfaces that should be used to transmit the multi cast data. In the example shown, the control information 102 also includes PDU header data. The downstream device 106 can generate multiple out-bound PDUs 108 by adding (e.g., pre-pending) the headers to copies of the multi cast data 104. The downstream device 106 can then transmit the generated PDUs 108 via the identified egress interfaces.

The network device 100 can store the control information 102 for a multi cast group to speed PDU processing. For example, the device 100 may store a table of headers and interfaces to be used for members of different multi cast groups (or sub-groups). Thus, determining the control information 102 becomes a matter of a fast table lookup. The network device 100 may be statically provisioned with the control information 102 or may update the control information 102 as members join and leave a multi cast group. For example, the network device 100 may receive group membership data transmitted via IGMP (Internet Group Management Protocol) messages from group members and multi cast routers or switches. Additionally, the device 100 may also dynamically modify the control information 102 based on changing network characteristics (e.g., as network connections become congested or go off-line).

Network device 100 may perform other operations beyond determining the control information 102 for given multi cast data. For example, the device 100 can facilitate multicasting of an IP datagram over an ATM network by segmenting the datagram data across different ATM cells. Techniques for associating ATM circuits with IP multi cast groups is described in greater detail in Request For Comments (RFC) 2022 (G. Armitage, Support for Multi cast over UNI 3.0/3.1 based ATM Networks, November 1996).

In the sample scheme depicted in FIG. 1, the limited responsibilities of the downstream device 100 enable the device to be implemented relatively inexpensively (e.g., as a Field Programmable Gate Array (FPGA) or other circuitry). The division of duties can also conserve resources of the network device 100. That is, instead of expending resources replicating PDUs, the device 100 can devote greater resources to other PDU processing tasks. Again, the technique illustrated above can also reduce traffic between device 100 and 106 as the multi cast data 104 may be transmitted, at most, once for a given multi cast group or sub-group.

Figure 2:
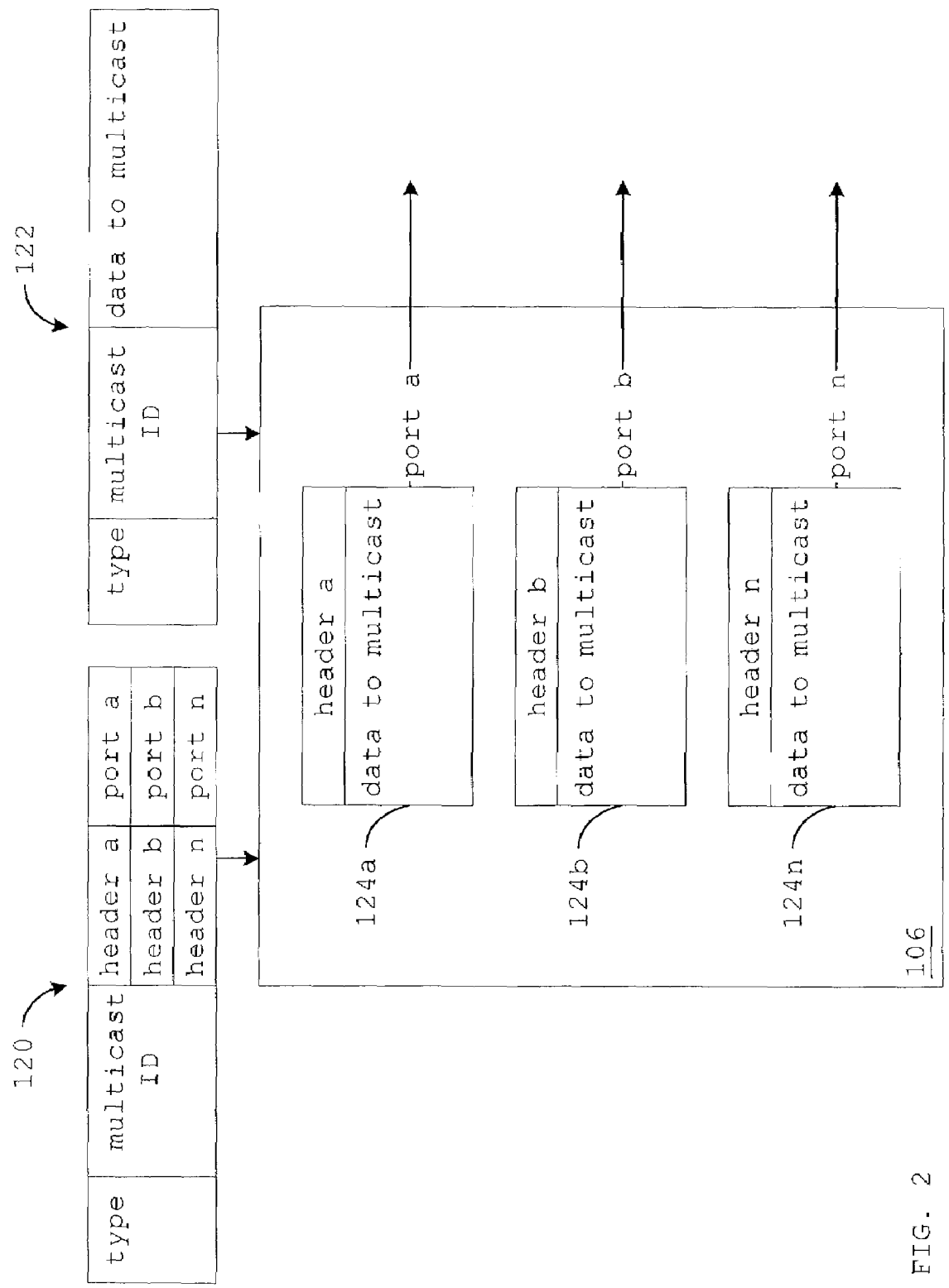
FIG. 2 is a diagram illustrating control and multi cast data.

FIG. 2 illustrates an example of control 120 and multi cast data 122 messages sent to the downstream device 106. As-shown, both messages 120, 122 include a "type" identifier to distinguish data messages 122 from control messages 120. Both messages also include a multi cast group identifier that enables the downstream device 106 to pair the messages 120, 122 together.

The data message 122 includes the data being multi cast. This data can include the payload of a multi cast PDU received by device 100 and may or may not include portions of the received PDU header. The control message 120 can include data for the different paths to be taken by copies of the multi cast message. For example, as shown, the message 120 includes pairs of headers/egress interfaces. For example, the pairs may include Virtual Path Identifiers (VPI) and a Virtual Channel Identifiers (VCI) of an ATM header and port or virtual port identifiers. After receiving the messages 120, 122 the downstream device 106 can construct the out-bound PDUs by copying the multi cast data and adding the header data. The device 120 can then output the constructed PDUs via the identified egress interfaces.

The messaging scheme shown in FIG. 2 is merely illustrative and many variations of the above can be implemented. For instance, instead of sending two different messages 120, 122, a single message can be used that includes both control and multi cast data.

Figure 3:
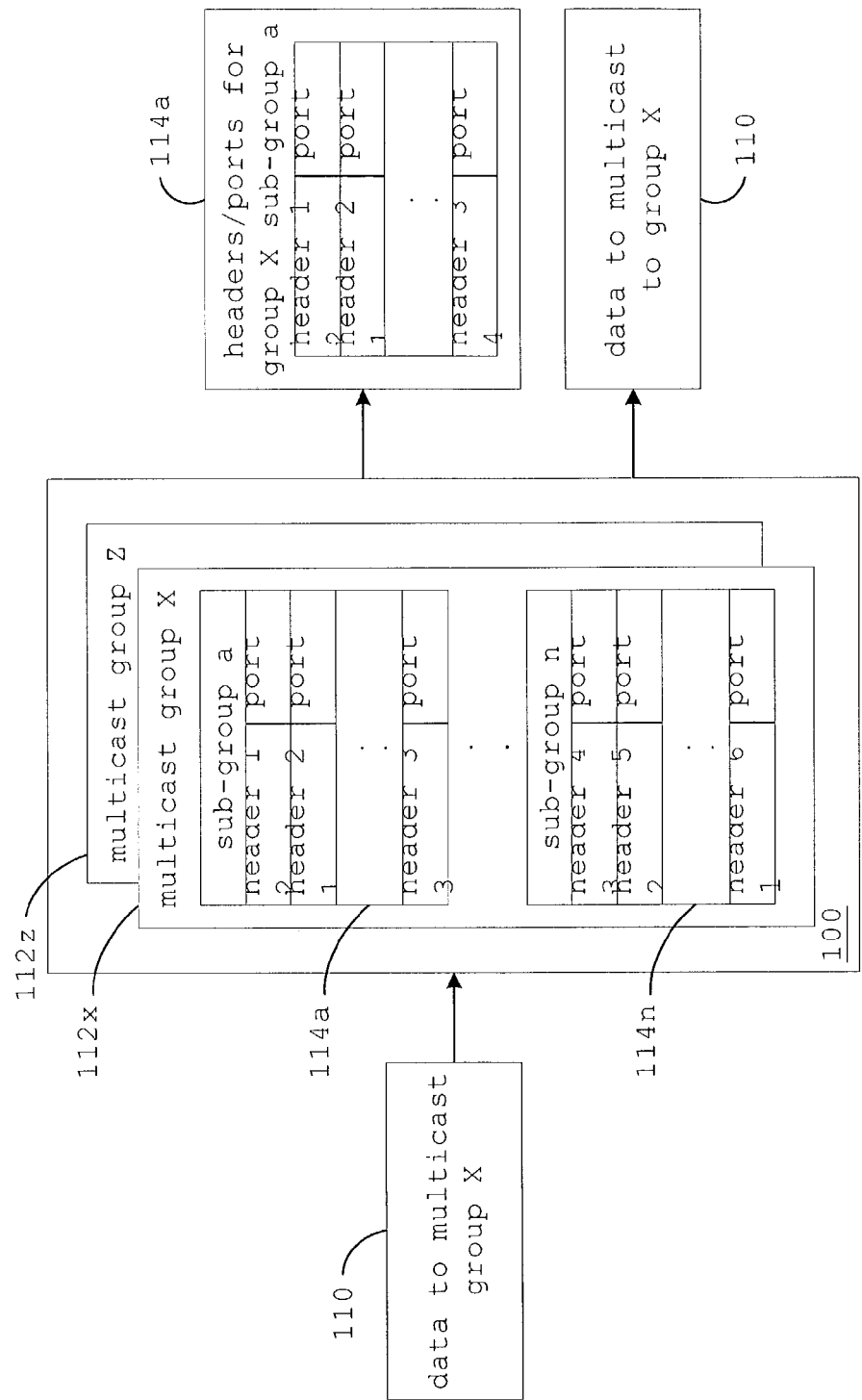
FIG. 3 is a diagram illustrating data identifying different multi cast group sub-groups.

Potentially, members of a multi cast group may have different associated data rates. For example, some multi cast group members may have a data rate associated with Digital Subscriber Loop (DSL) connections while others have data rates associated with T1 connections. As shown in FIG. 3, the device 100 can categorize different multi cast group 112 members according to their different data rates 114. In the example illustrated, multi cast group 112x includes data rate sub-groups 114a, 114n. As shown, the control data stored for members of a sub-group 114a, 114n can include identification (e.g., port numbers or Ethernet addresses) of the downstream egress interfaces used to transmit a multi cast message to the sub-group 114 members and/or header data used to prepare the out-bound PDUs at the downstream device 106. For instance, for sub-group 114a, multi cast data 110 should be output via downstream ports "2", "1", and "3".

As shown, device 100 can transmit control data 114a to the downstream device 106 for individual data rate sub-groups. Transmitting control information 114a and multi cast 110 data, at most, once per sub-group enables the downstream device 106 to efficiently handle transmission of the multi cast data. Additionally, when multi cast data is being sent to multiple sub-groups, the device 100 can flag the multi cast data for storage by the downstream entity 106. This can eliminate retransmission of the multi cast data to the downstream entity 106 for each sub-group. As described below, grouping members by data rate can also potentially ease transmission scheduling and can reduce system complexity.

Figure 4:
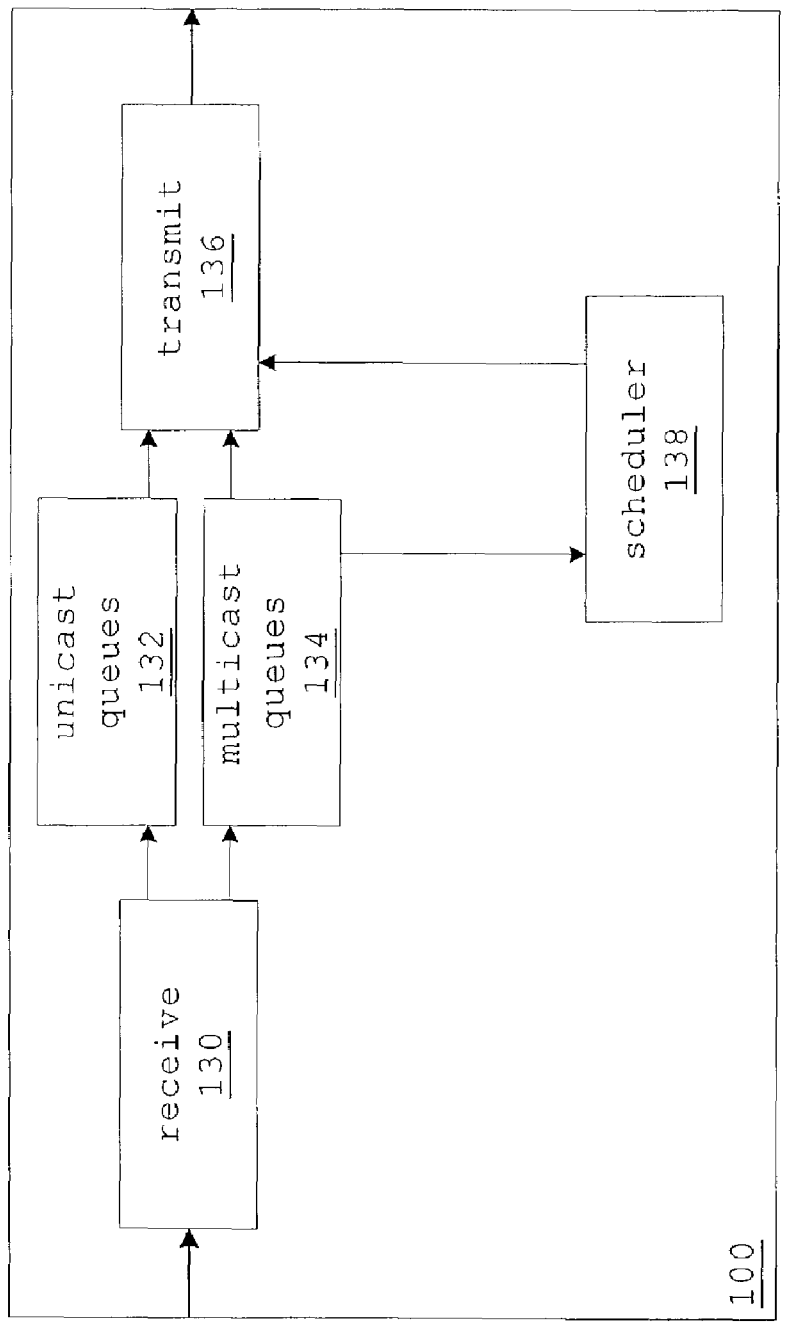
FIG. 4 is a diagram of logic to transmit multi cast data via egress interfaces.

FIG. 4 illustrates a scheme that device 100 can implement to coordinate efficient handling of multi cast data via the downstream device 106. As shown, when data arrives at the device, receive logic 130 determines whether the data is a unicast or multi cast transmission and enters a request to transmit the data in the appropriate queue 132, 134. For multi cast data, an entry can be queued in a multi cast queue 134 for each multi cast sub-group.

A scheduler 138 determines when the set of egress interfaces used to multi cast to a sub-group are available. At the time scheduled, transmit logic 136 sends the multi cast and control data to the downstream device. The downstream device 106 can then generate the specified PDUs and output them via the egress interfaces.

Figure 5:
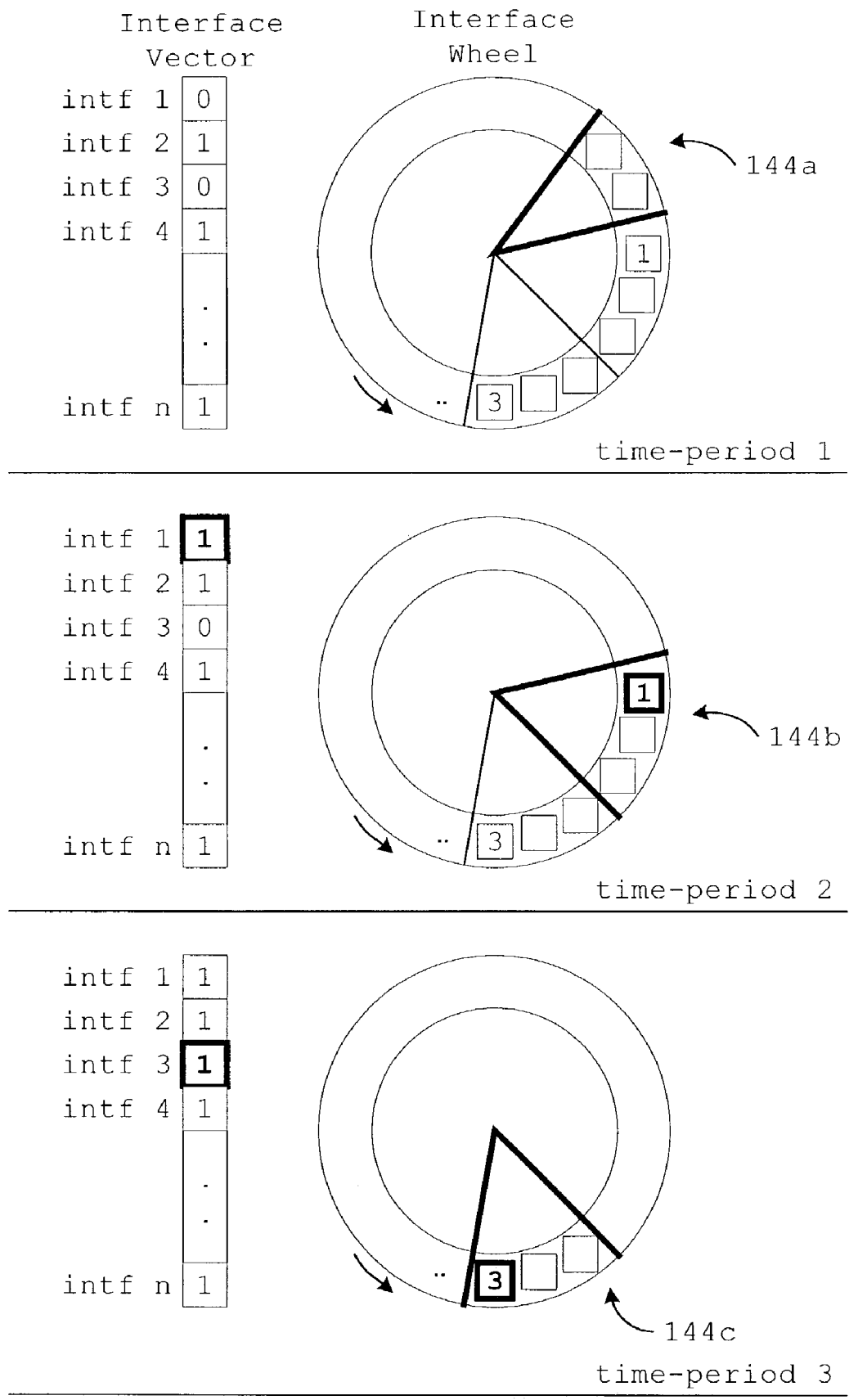
FIG. 5 is a diagram illustrating interface scheduling.

FIG. 5 illustrates an example of a scheduling scheme that synchronizes availability of the egress interfaces used by a particular multi cast group or sub-group. The scheme includes a interface vector for each multi cast group or data rate sub-group receiving multi cast data. A bit (labeled "intf #") within the vector identifies the availability of an egress interface. Initially, the vector may be setup so that bits corresponding to the egress interfaces to be used to transmit multi cast data are set to "0" while the remaining vector bits are set to "1". In the example shown, the multi cast data will be transmitted via interfaces "1" and "3".

The scheme also includes an interface "wheel" that identifies when egress interfaces will become available for a transmission. As shown, in a given time-period (e.g., a set of downstream device cycles), illustrated as a pie-slice of the wheel, one or more interfaces may be scheduled for availability. For instance, in time-period "2" 144b egress interface "1" will become available, for example, after completing transmission of a previously scheduled PDU and awaiting some minimum gap time between transmissions. Thus, for time-period "2", the bit for interface "1" is set to "1" and the use of interface "1" is reserved (e.g., the interface cannot be scheduled for other unicast or multi cast use until the multi cast data is transmitted). Finally, in time-period "3" 144c, egress interface "3" will become available and the bit for interface "3" is set to "1". Thus, at time-period "3", all bits in the vector are set. Thus, the needed interfaces have been reserved for the multi cast sub-group. A schedule entry (e.g., the multi cast ID) can be made for the sub-group at the specified time. Other entries identify other scheduled multi cast groups/sub-groups and unicast transmissions. When time-period "3", arrives, the schedule entry causes the device 100 to transmit the control and multi cast data to the downstream device.

The interface wheel is continually updated to reflect the future availability of interfaces. Thus, entries for interfaces "1" and "3" can be re-inserted into the wheel after time-period "3" based on the size and data rate of the transmission. Since the sub-groups may be based on data rate, the technique described above can keep the interfaces synchronized after the initial synchronization. That is, since the interfaces are operated at the same rate and may transmit the same amount of data, the interfaces may be scheduled at the same future time-periods. This can ease scheduling operations.

The scenarios illustrated above assumed that a given set of interfaces could be reserved within a given period of time. However, such scheduling may not always be possible. In such cases, the multi cast transmissions to the different interfaces may be enqueued in unicast queues.

Provisioning bandwidth for the multi cast traffic may be performed. Since the constituent ports in the multi cast group may be of different rates, apportioning bandwidth for the multi cast group can ensure the minimum bandwidth requirement at each port to process the multi cast stream. The definition of minimum bandwidth for multi cast traffic may be defined in cases where such traffic contains real-time data (video). For multi cast traffic that is processed at best-effort priority, the scheduler performs a different set of operations compared to multi cast groups that have bandwidth associated with it. The scheduler distinguishes between unicast and multi cast traffic. For multi cast traffic, if a minimum bandwidth is assigned to a multi cast group, a unique ID associated with the multi cast group will be used to populate the scheduler wheel. A schedule entry for unicast traffic will contain an index to the unicast queue and for multi cast traffic, a schedule entry will index into a table of bit-vectors. The significance of the bit-vector is to be able to identify the physical ports that are eligible for transmission. To determine the eligibility of each physical port in the multi cast group, the scheduler will use the physical port's inter-packet/cell gap along with other schedule information of other packets/cells on that port. The scheduler then reconciles the time when the multi cast packet/cell needs to be sent to meet the minimum bandwidth (of the multi cast group's bandwidth) criteria with the physical port bandwidth. For ports that are eligible, the bit-vector associated with the multi cast group will be updated. For ports that cannot be reconciled, the multi cast packet will be en-queued into the unicast queue since such ports will not be able to transmit that multi cast packet along with other ports in the multi cast group.

If multi cast packets/cells are sent with a best-effort priority, the scheduler will determine when ports in the multi cast group become eligible and, based on this information, it will group a subset of multi cast group physical ports for transmission. If such an alignment of transmission time among some subset of the physical ports in the multi cast group is not possible, the multi cast packet is replicated and copied into the respective unicast queues.

Packet/cell replication may be avoided by using a virtual queue concept, where a packet is not removed from a queue until the packet is transmitted among all the members of the multi cast group.

Figure 6:
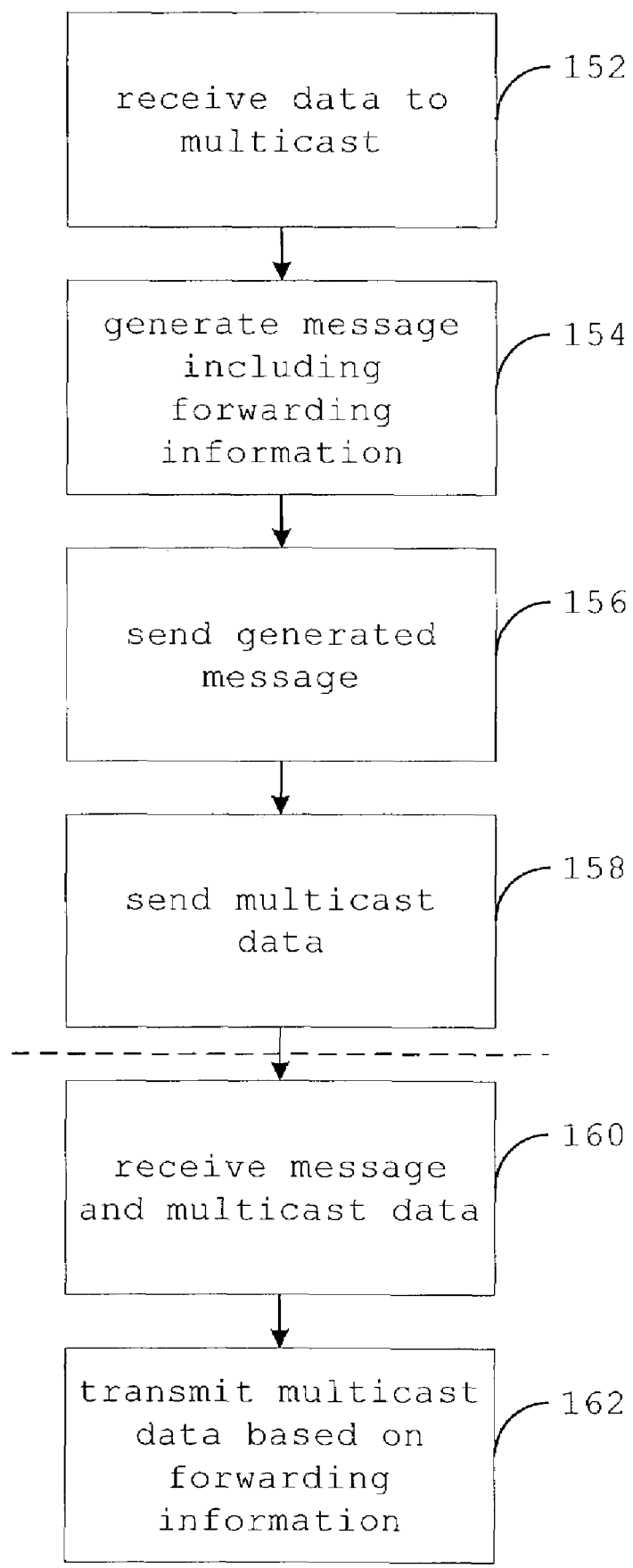
FIG. 6 is a flow-chart of a process for multicasting data.

FIG. 6 depicts a flow-chart illustrating operation of the sample system described above. After receiving 152 data to multi cast to a multi cast group, forwarding information for the message is determined 154 (e.g., egress interfaces of the downstream device and PDU headers). After receiving 160 the transmitted multi cast 156 and control data 158, the downstream device can construct PDUs and forward 162 the PDUs via the appropriate egress interfaces based on the control information.

Figure 7:
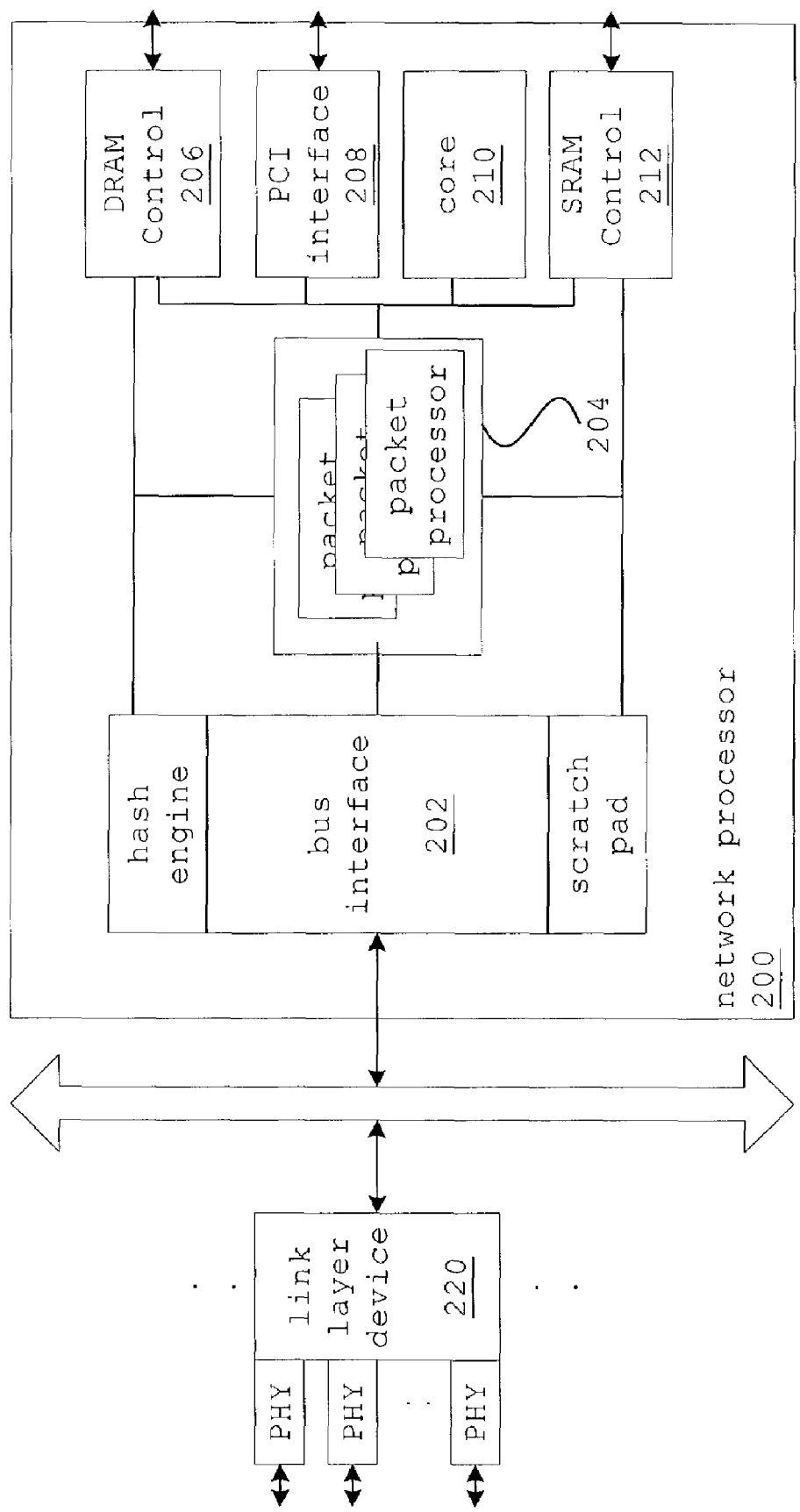
FIG. 7 is a diagram of a network processor.

The techniques described above may be used in a wide variety of systems. For example, FIG. 7 depicts a programmable network processor 200 that features multiple packet processors 204. The network processor 200 shown is an Intel® Internet eXchange network Processor (IXP). Other network processors feature different designs.

As shown, the network processor 200 features an interface 202 (e.g., an Internet eXchange bus interface) that can carries PDUs between the processor 200 and network components. For example, the bus may carry PDUs received via physical layer (PHY) components (e.g., wireless, optic, or copper PHYs) and link layer component(s) 222 (e.g., MACs and framers). The processor 200 also includes an interface 208 for communicating, for example, with a host. Such an interface may be a Peripheral Component Interconnect (PCI) type interface such as a PCI-X bus interface. The processor 200 also includes other components such as memory controllers 206, 212, a hash engine, and scratch pad memory.

The network processor 200 shown features a collection of packet processors 204. The packet processors 204 may be Reduced Instruction Set Computing (RISC) processors tailored for network PDU processing. For example, the packet processors may not include floating point instructions or instructions for integer multiplication or division commonly provided by general purpose central processing units (CPUs).

An individual packet processor 204 may offer multiple threads. The multi-threading capability of the packet processors 204 is supported by context hardware that reserves different general purpose registers for different threads and can quickly swap instruction and status data for the different threads between context registers and context storage.

The processor 200 also includes a core processor 210 (e.g., a StrongARM® XScale®) that is often programmed to perform "control plane" tasks involved in network operations. The core processor 210, however, may also handle "data plane" tasks and may provide additional datagram processing threads.

The network processor 200 may implement the techniques described above in a variety of ways. For example, the control data may be stored as an array in DRAM while different packet processor 204 and core 210 threads process received PDUs and implement scheduling logic.

The techniques may be implemented in hardware, software, or a combination of the two. For example, the techniques may be implemented by programming a network processor or other processing system. The programs may be disposed on computer readable mediums and include instructions for causing processor(s) to execute instructions implementing the techniques described above.

Other embodiments are within the scope of the following claims.

What is claimed is:

1. A method of multicasting data over a network, the method comprising:
   determining forwarding information for at least a sub-set of members of a multicast group, the forwarding information corresponding to different egress interfaces of a downstream entity;
   sending, toward the downstream entity, at most a single copy of data to be multicasted to the sub-set of members and the determined forwarding information; and
   scheduling transmission via the multiple egress interfaces in accordance with bandwidth provisioned to the multicast group.

2. The method of claim 1, further comprising transmitting, from the downstream entity, multiple copies of the data to be multicasted via the downstream device egress interfaces identified by the forwarding information.

3. The method of claim 1, wherein the sub-set comprises a sub-group of members of a multicast group sharing a data rate.

4. The method of claim 1, further comprising sending, to the downstream entity, data of multiple protocol data unit headers.

5. The method of claim 4, further comprising, at the downstream entity, constructing multiple protocol data units using the multicast data and the data of multiple protocol data unit headers.

6. The method of claim 5, wherein the protocol data units include an Asynchronous Transfer Mode (ATM) cell having a header that includes a Virtual Path Identifier (VPI) and a Virtual Channel Identifier (VCI).

7. The method of claim 1, wherein the scheduling comprises synchronizing scheduling of egress interfaces used to carry PDUs to group members sharing a data rate.

8. The method of claim 1, wherein the downstream device comprises a link layer device.

9. The method of claim 8, wherein the link layer device comprises a medium access controller (MAC).

10. The method of claim 1, further comprising storing control data for at least one of multicast groups and sub-groups, the control data at least identifying egress interfaces for members of the at least one of multicast groups and sub-groups.

11. A device, comprising:
at least one interface to a downstream entity;
logic to:
determine forwarding information for at least a sub-set of members of a multicast group, the forwarding information corresponding to different egress interfaces of a downstream entity;
send, toward the downstream entity, at most a single copy of data to be multicasted to the sub-set of members and the determined forwarding information; and
schedule transmission via the egress interfaces, said logic to schedule comprising logic to schedule in accordance with bandwidth provisioned to the multicast group and rates of the egress interfaces.

12. The device of claim 11, wherein the sub-set comprises a sub-group of members of a multicast group sharing a data rate.

13. The device of claim 11, further comprising logic to send, to the downstream entity, data of multiple protocol data unit headers.

14. The device of claim 13, wherein the headers comprise headers for Asynchronous Transfer Mode (ATM) cells that include a Virtual Path Identifier (VPI) and a Virtual Channel Identifier (VCI).

15. The device of claim 11, wherein the logic to schedule comprises logic to synchronize scheduling of egress interfaces used to carry PDUs to group members sharing a data rate.

16. The device of claim 11, wherein the multicast group is configured to operate in best-effort mode.

17. The device of claim 11, wherein the downstream device comprises a link layer device.

18. The device of claim 11, further comprising memory storing control data for at least one of multicast groups and sub-groups, the control data at least identifying egress interfaces for members of the at least one of multicast groups and sub-groups.

19. The device of claim 11, wherein the logic comprises multiple Reduced Instruction Set Computing (RISC) processors programmed to implement the logic.

20. A device, comprising:
a collection of egress interfaces;
logic to:
receive a single copy of data to be multicasted to at least a sub-set of members of a multicast group and receive forwarding information for the at least a sub-set of members of the multicast group, the forwarding information cofresponding to at least a subset of the collection egress interfaces;
transmit the data to be multicasted via more than one egress interface based on the forwarding information; and
schedule transmission via the collection of egress interfaces, said logic to schedule comprising logic to schedule in accordance with bandwidth provisioned to the multicast group and rates of the egress interfaces.

21. The device of claim 20, wherein the forwarding information comprises forwarding information corresponding to a sub-group of members of a multicast group sharing a data rate.

22. The device of claim 20, further comprising logic to receive multiple protocol data unit headers.

23. The device of claim 22, further comprising logic to construct multiple protocol data units using the multicast data and the data that identifies multiple protocol data unit headers.

24. The device of claim 23, wherein the protocol data units include an Asynchronous Transfer Mode (ATM) cell having a header that includes a Virtual Path Identifier (VPI) and a Virtual Channel Identifier (VCI).

25. An article comprising a computer-readable storage medium having stored thereon instructions that when executed by a computer result in the following:
determine forwarding information for at least a sub-set of members of a multicast group, the forwarding information corresponding to different egress interfaces of a downstream entity;
send, toward the downstream entity, at most a single copy of data to be multicasted to the sub-set of members and the determined forwarding information; and
schedule transmission via the egress interfaces in accordance with bandwidth provisioned to the multicast group.

26. The article of claim 25, wherein the sub-set comprises a sub- group of members of a multicast group sharing a data rate.

27. The article of claim 25, further comprising instructions to cause the processor to send, toward the downstream entity, data that identifies multiple protocol data unit headers.

28. The article of claim 25, wherein the instructions for causing the processor to schedule comprise instructions that cause the processor to synchronize scheduling of egress interfaces used to carry PDUs to group members sharing a data rate.

29. The article of claim 25, wherein the instructions to cause the processor to send the multicast data to the downstream entity comprise instructions to cause the processor to send the multicast data, at most, once per sub-group.

30. A system, comprising:
a network processor having multiple Reduced Instruction Set Computing (RISC) packet processors, the network processor to execute instructions to:
determine forwarding information for at least a sub-set of members of a multicast group, the forwarding information corresponding to different egress interfaces of a downstream entity; and
send, toward the downstream entity having multiple egress interfaces, at most a single copy of data to be multicasted to the sub-set of members and the determined forwarding information; and
an Ethernet medium access controller (MAC) including logic to:
schedule transmission via the multiple egress interfaces in accordance with bandwidth provisioned to the multicast group and rates of the egress interfaces:
receive the data to be multicasted and the forwarding information; and
transmit the data to be multicasted via the egress interfaces identified by the forwarding information.

31. The system of claim 30,
wherein the packet processor instructions further comprise instructions to transmit data for multiple protocol data unit headers to the Ethernet medium access controller; and
wherein the Ethernet medium access controller logic comprises logic to construct multiple protocol data units from the data to be multicasted and the data for multiple protocol data unit headers.

32. The system of claim 30, wherein the at least a sub-set of member of a multicast sub-group comprise members of a multicast group sharing a data rate.

33. The system of claim 30, wherein the instructions comprise instructions to synchronize scheduling of transmission via the multiple egress interfaces.

\* \* \* \* \*

UNITED STATES PATENT AND TRADEMARK OFFICE
CERTIFICATE OF CORRECTION

| | | |
|---|---|---|
| PATENT NO. | : 7,391,772 B2 | Page 1 of 1 |
| APPLICATION NO. | : 10/409744 | |
| DATED | : June 24, 2008 | |
| INVENTOR(S) | : Hooper et al. | |

It is certified that error appears in the above-identified patent and that said Letters Patent is hereby corrected as shown below:

In column 7, line 58, in Claim 20, delete "coffesponding" and insert -- corresponding --, therefor.

In column 8, line 63, in Claim 30, delete "interfaces:" and insert -- interfaces; --, therefor.

Signed and Sealed this

Thirtieth Day of September, 2008

JON W. DUDAS
*Director of the United States Patent and Trademark Office*